(No Model.)

W. D. GRAVES, Jr.
OILER FOR LOOSE PULLEYS.

No. 291,334. Patented Jan. 1, 1884.

WITNESSES:
Theo. G. Hoster
C. Sedgwick

INVENTOR:
W. D. Graves Jr
BY Munn & Co
ATTORNEYS.

UNITED STATES PATENT OFFICE.

WILLIAM D. GRAVES, JR., OF PRESQUE ISLE, MAINE.

OILER FOR LOOSE PULLEYS.

SPECIFICATION forming part of Letters Patent No. 291,334, dated January 1, 1884.

Application filed October 10, 1883. (No model.)

*To all whom it may concern:*

Be it known that I, WILLIAM D. GRAVES, Jr., of Presque Isle, in the county of Aroostook and State of Maine, have invented certain new and useful Improvements in Oilers for Loose Pulleys, of which the following is a full, clear, and exact description.

Loose pulleys used in connection with machines of various kinds require, as ordinarily constructed, much care and attention to keep their bearings on the shaft properly oiled, and even with the best of care they frequently run dry and heat and are often the first portion of a machine to wear out.

My invention consists in an oiler for loose pulleys, of novel construction, and in which the oil is supplied to the pulley in the right place—that is, at or near its center, and only at the right time—that is, when the pulley is running and its shaft is standing, substantially as hereinafter described.

Reference is to be had to the accompanying drawings, forming part of this specification, in which similar letters of reference indicate corresponding parts in all the figures.

Figure 1:
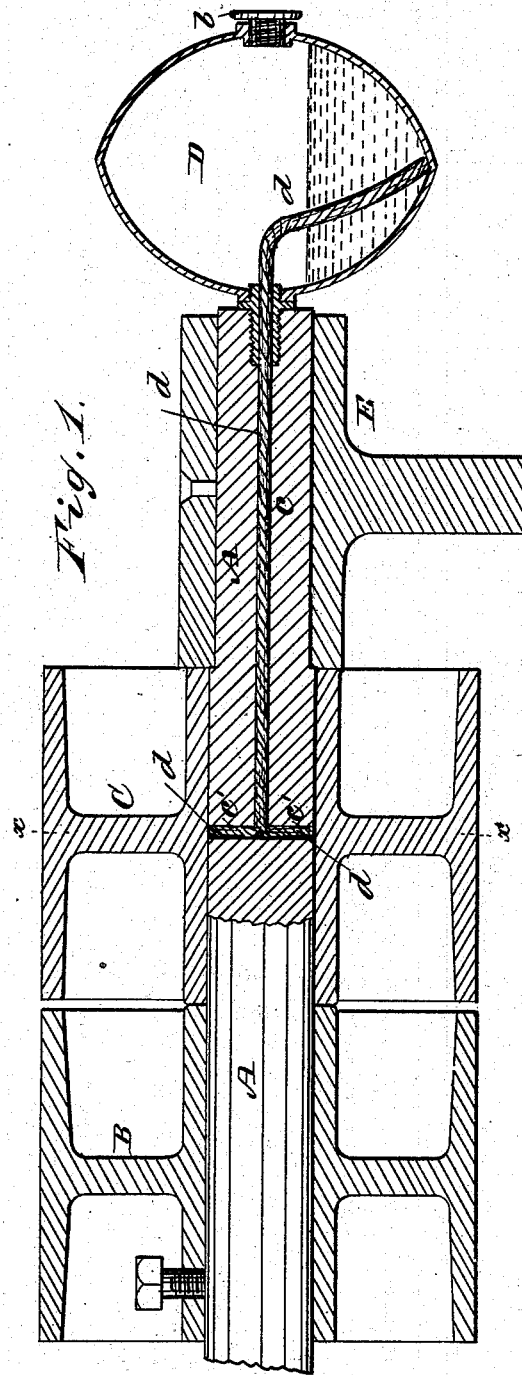
Figure 3:
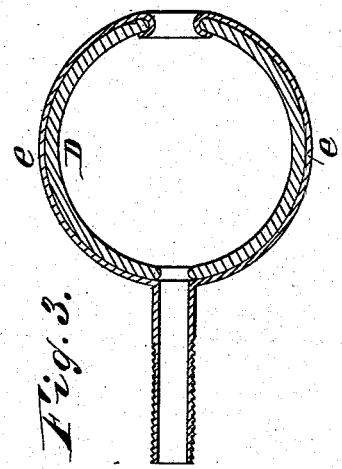
Figure 2:
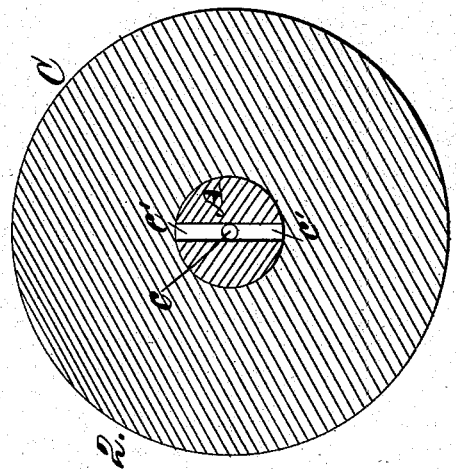

Figure 1 represents a mainly sectional longitudinal view of a piece of shafting with fast and loose pulleys thereon and with my improved oiling device applied. Fig. 2 is a transverse section of the same on the line $x$ $x$ in Fig. 1, and Fig. 3 is a sectional view of a modified construction of the oil-cup.

A indicates the shaft in part, on which are arranged a fast pulley, B, and loose pulley C.

D in Fig. 1 is a metal oil-cup secured by screw-nipple or otherwise into the facial end of the shaft nearest the loose pulley outside of or beyond the bearing E of the shaft. This cup is charged, through a filling-nozzle, $b$, with a sufficient quantity of oil to lubricate the bearing of the loose pulley for a prolonged period of time.

In and along the center of the shaft A, extending from its end, to which the oil-cup is attached, to a distance which is central or thereabout of the loose pulley C, is an aperture, $c$, that connects with the oil-cup at its one end and with a cross-aperture, $c'$, passing through the shaft at its other end. These apertures serve to receive within them a wick, $d$, that dips down into the oil in the cup.

Instead of the cup D being constructed of metal, it may be made of glass, in globe-form, as shown in Fig. 3, and be held by four (more or less) prongs, $e$, formed by splitting the tube which connects the cup with the shaft.

From the foregoing description it will be seen that when the shaft is in motion, carrying with it the oiler D, the centrifugal force throws the oil to the outside rim of the oiler, and does not allow it to be drawn in by the wick; but when the shaft is at rest and the loose pulley is in motion, the oil is absorbed freely by the wick and carried to the center or thereabout of the loose pulley, thus giving it oil at the place and only when required, thereby saving a large amount of oil; and, by reason of the cup forming a reservoir of oil, it will keep up a good supply for a lengthened period, so that but little care or attention is necessary, there will be little or no liability of the pulley to run dry or heat, and the pulley, even when considerably worn, will continue to run satisfactorily, which it would not do without my improved oiling device.

I am aware that it is not new, broadly, to supply lubricant to the bearing-surface by wicking leading from a lubricant-reservoir, and conducted by a wire through a longitudinal passage in the shaft and to an oblique passage, said reservoir constituting a part of the wheel-retaining device or cap.

Having thus described my invention, what I claim as new, and desire to secure by Letters Patent, is—

In oiling or lubricating devices for loose pulleys, the combination, with the shaft A, constructed with a longitudinal aperture, $c$, extending from one end thereof to a transverse aperture, $c'$, arranged at about a point in a central plane with the pulley of said shaft, of an oil or lubricant cup or vessel, D, having a screw-threaded attaching tube and wicking, $d$, substantially as shown and described, and for the purpose set forth.

WILLIAM D. GRAVES, JR.

Witnesses:
CHAS. P. ALLEN,
L. GRAVES.